(12) United States Patent
Sato et al.

(10) Patent No.: US 7,839,526 B2
(45) Date of Patent: Nov. 23, 2010

(54) RESERVATION OF SECONDARY PRINTING DEVICES IN A SUBSTITUTE PRINTING SYSTEM

(75) Inventors: Mitsuhiko Sato, Kashiwa (JP); Tatsuya Goto, Abiko (JP); Katsuhide Koga, Moriya (JP); Tomohisa Itagaki, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 1019 days.

(21) Appl. No.: 11/608,641

(22) Filed: Dec. 8, 2006

(65) Prior Publication Data

US 2007/0139702 A1 Jun. 21, 2007

(30) Foreign Application Priority Data

Dec. 20, 2005 (JP) ............................. 2005-366419

(51) Int. Cl.
*G06F 3/12* (2006.01)
(52) U.S. Cl. .......................... 358/1.15; 399/10; 399/16; 399/18; 399/8; 399/9; 399/31
(58) Field of Classification Search ................ 358/1.15; 399/9–37
See application file for complete search history.

(56) References Cited

U.S. PATENT DOCUMENTS

| | | | | |
|---|---|---|---|---|
| 6,292,267 | B1* | 9/2001 | Mori et al. .................. | 358/1.15 |
| 6,367,997 | B2* | 4/2002 | Ito .............................. | 400/582 |
| 7,158,259 | B2* | 1/2007 | Sugiyama et al. ............. | 358/1.8 |
| 7,486,414 | B2* | 2/2009 | Arai ............................ | 358/1.9 |
| 2002/0089692 | A1* | 7/2002 | Ferlitsch ..................... | 358/1.15 |
| 2002/0097424 | A1* | 7/2002 | Ferlitsch ..................... | 358/1.15 |
| 2002/0196459 | A1* | 12/2002 | Kadowaki ................... | 358/1.14 |
| 2004/0190042 | A1* | 9/2004 | Ferlitsch et al. ............. | 358/1.15 |
| 2004/0257614 | A1* | 12/2004 | Tanimoto .................... | 358/1.15 |
| 2004/0263870 | A1* | 12/2004 | Itoh et al. .................... | 358/1.1 |
| 2005/0128512 | A1* | 6/2005 | Kurotsu ...................... | 358/1.15 |
| 2005/0128514 | A1* | 6/2005 | Wanda et al. ............... | 358/1.15 |
| 2005/0141014 | A1* | 6/2005 | Kikuchi et al. ............. | 358/1.14 |
| 2005/0190395 | A1* | 9/2005 | Aritomi ...................... | 358/1.13 |
| 2006/0044594 | A1* | 3/2006 | Shirai ......................... | 358/1.14 |
| 2006/0227363 | A1* | 10/2006 | Ogura ........................ | 358/1.15 |
| 2006/0285127 | A1* | 12/2006 | Sugimoto ................... | 358/1.1 |
| 2007/0024895 | A1* | 2/2007 | Clark ......................... | 358/1.15 |
| 2007/0120934 | A1* | 5/2007 | Lang .......................... | 347/104 |
| 2007/0127063 | A1* | 6/2007 | Fertlitsch et al. ........... | 358/1.15 |

FOREIGN PATENT DOCUMENTS

| | | |
|---|---|---|
| JP | 07-281850 A | 10/1995 |
| JP | 11194914 A | 7/1999 |
| JP | 2000-339126 A | 12/2000 |
| JP | 2002-189578 A | 7/2002 |
| JP | 2002207584 A | 7/2002 |

* cited by examiner

*Primary Examiner*—David K Moore
*Assistant Examiner*—Benjamin O Dulaney
(74) *Attorney, Agent, or Firm*—Canon USA Inc. IP Division

(57) ABSTRACT

A printing system includes printing apparatuses connected to a network. A control apparatus of the printing system may send a print job to each printing apparatus and instruct each printing apparatus to execute the print job. When a first printing apparatus is instructed to execute the print job, the control apparatus makes a substitute printing reservation. The substitute printing reservation is for a second printing apparatus to execute the print job instead of the first printing apparatus. The second printing apparatus is set to a waiting state in which the second printing apparatus waits to execute the print job instead of the first printing apparatus.

13 Claims, 12 Drawing Sheets

FIG. 2

| COMMAND NAME | CONTENT | PARAMETER | DIRECTION |
|---|---|---|---|
| PRINTING OPERATION START | START OF PRINTING OPERATION | JOB CONTENT | S→P |
| OPERATION END | END OF PRINTING OPERATION | NORMAL END/ ABNORMAL END | P→S |
| SUBSTITUTE PRINTING RESERVE | RESERVATION OF SUBSTITUTE PRINTING | PRIORITY LEVEL/CONTENT OF RESERVED PRINT JOB | S→P |
| SUBSTITUTE PRINTING RESERVATION RESPONSE | RESPONSE TO SUBSTITUTE PRINTING RESERVATION COMMAND | OK/NG | P→S |
| SUBSTITUTE PRINTING RESERVATION CANCEL | CANCELLATION OF SUBSTITUTE PRINTING RESERVATION | NONE | S→P |
| SUBSTITUTE PRINTING RESERVATION CANCELLATION REQUEST | NOTIFICATION OF DISABLE STATE OF PRINTER FOR RESERVED SUBSTITUTE PRINTING RESERVATION | FACTOR OF CANCELLATION REQUEST | P→S |
| STABILITY PREFERENCE | SWITCH TO OPERATION MODE GIVING PREFERENCE TO STABILITY OVER PRODUCTIVITY | NONE | S→P |

FIG. 3

| | |
|---|---|
| PRIORITY LEVEL 1 | ACCEPTANCE OF SUBSTITUTE PRINTING RESERVE COMMAND AND PRINTING OPERATION START COMMAND FROM ANOTHER PRINT SERVER IS INHIBITED |
| PRIORITY LEVEL 2 | ACCEPTANCE OF ONLY PRINT JOB NOT USING CONSUMABLE SUPPLIES SPECIFIED IN SUBSTITUTE PRINTING RESERVE COMMAND IS PERMITTED |
| PRIORITY LEVEL 3 | ACCEPTANCE OF SUBSTITUTE PRINTING RESERVE COMMAND AND PRINTING OPERATION START COMMAND FROM ANOTHER PRINT SERVER IS PERMITTED |

RESERVATION OF SECONDARY PRINTING DEVICES IN A SUBSTITUTE PRINTING SYSTEM

BACKGROUND OF THE INVENTION

1. Field of the Invention

The present invention relates to printing systems in which a plurality of printing apparatuses and at least one control apparatus are interconnected via networks. The present invention also relates to printing apparatuses and control apparatuses which can be implemented in such printing systems.

2. Description of the Related Art

Printing systems which allow execution of substitute printing are known. In such a substitute printing system, when an error occurs in a printing apparatus for performing a print job, another printing apparatus capable of performing the print job is selected. Then, information on the print job is transferred to the selected printing apparatus (see, for example, Japanese Patent Laid-Open No. 07-281850). According to this substitute printing system, unexpected interruption of a printing process due to an error can be avoided, which increases productivity in printing.

In addition, for example, Japanese Patent Laid-Open No. 2000-339126 describes another substitute printing technique. Specifically, even in a case where there is a difference in capability between a printing apparatus in which an error has occurred and other printing apparatuses to be used for substitute printing, a printing result desired by a user can be obtained using a selected printing apparatus.

In such substitute printing systems described above, substitute printing apparatuses are to be selected after errors occur. Thus, when an instruction of substitute printing is sent to the selected apparatus while the apparatus is in a low power consumption state, it takes a long time until the selected printing apparatus enters a printable state to provide a print output. In addition, in such a selected printing apparatus to be used for substitute printing, operations to be performed as necessary for optimization of the apparatus, such as an automatic adjustment operation, may disadvantageously delay the start of the substitute printing. Further, when a printing apparatus, which receives an instruction of substitute printing, has been executing another print job, the substitute printing cannot be performed until the ongoing print job is completed. This also results in a delay of the start of substitute printing.

SUMMARY OF THE INVENTION

The present invention has been made in view of the above circumstances. Accordingly, there is a need for a printing system which, when a printing apparatus fails to execute an instructed print job, allows the print job to be immediately executed by another printing apparatus. There is also a need for a printing apparatus and a control apparatus for implementing such a printing system.

To this end, a printing system according to an aspect of the present invention includes a plurality of printing apparatuses connected to a network and at least one control apparatus, wherein the control apparatus sends a print job to at least one of the printing apparatuses and instructs the at least one printing apparatuses to execute the print job, wherein when a first printing apparatus from among the plurality of printing apparatuses is instructed to execute the print job, the control apparatus makes a substitute printing reservation for at least one second printing apparatus, wherein the substitute printing reservation allows the at least one second printing apparatus to execute the print job instead of the first printing apparatus, and wherein the at least one second printing apparatus for which the substitute printing reservation has been made is set to a waiting state for waiting to execute the print job instead of the first printing apparatus.

According to a second aspect of the present invention, a printing apparatus, connected via a network to at least one control apparatus, executes a print job in accordance with an instruction from the at least one control apparatus for execution of the print job, the printing apparatus including an accepting unit configured to accept a substitute printing reservation made by the at least one control apparatus, the substitute printing reservation allowing the printing apparatus to execute a print job, and an apparatus state setting unit configured to, when the substitute printing reservation has been accepted, set the printing to a waiting state for waiting to execute the print job.

According to a third aspect of the present invention, a control apparatus connected to a plurality of printing apparatuses via a network, sends a print job to at least one of the plurality of printing apparatuses instructing the at least one of the plurality of printing apparatuses to execute the print job, the control apparatus including a print job execution instructing unit configured to send the print job to a first printing apparatus from among the plurality of printing apparatuses instructing the first printing apparatus to execute the print job, and a substitute printing reservation unit configured to, when the first printing apparatus has been instructed to execute the print job, make a substitute printing reservation allowing at least one second printing apparatus to execute the print job instead of the first printing apparatus.

Further features of the present invention will become apparent from the following description of exemplary embodiments with reference to the attached drawings.

BRIEF DESCRIPTION OF THE DRAWINGS

FIG. 2 illustrates a list of command to be sent and received to and from a print server and a printer.

FIG. 3 illustrates the content of a priority level contained in a "substitute printing reserve" command.

DESCRIPTION OF THE EXEMPLARY EMBODIMENTS

In the following exemplary embodiments of the present invention will be described with reference to the accompanying drawings.

Figure 1:
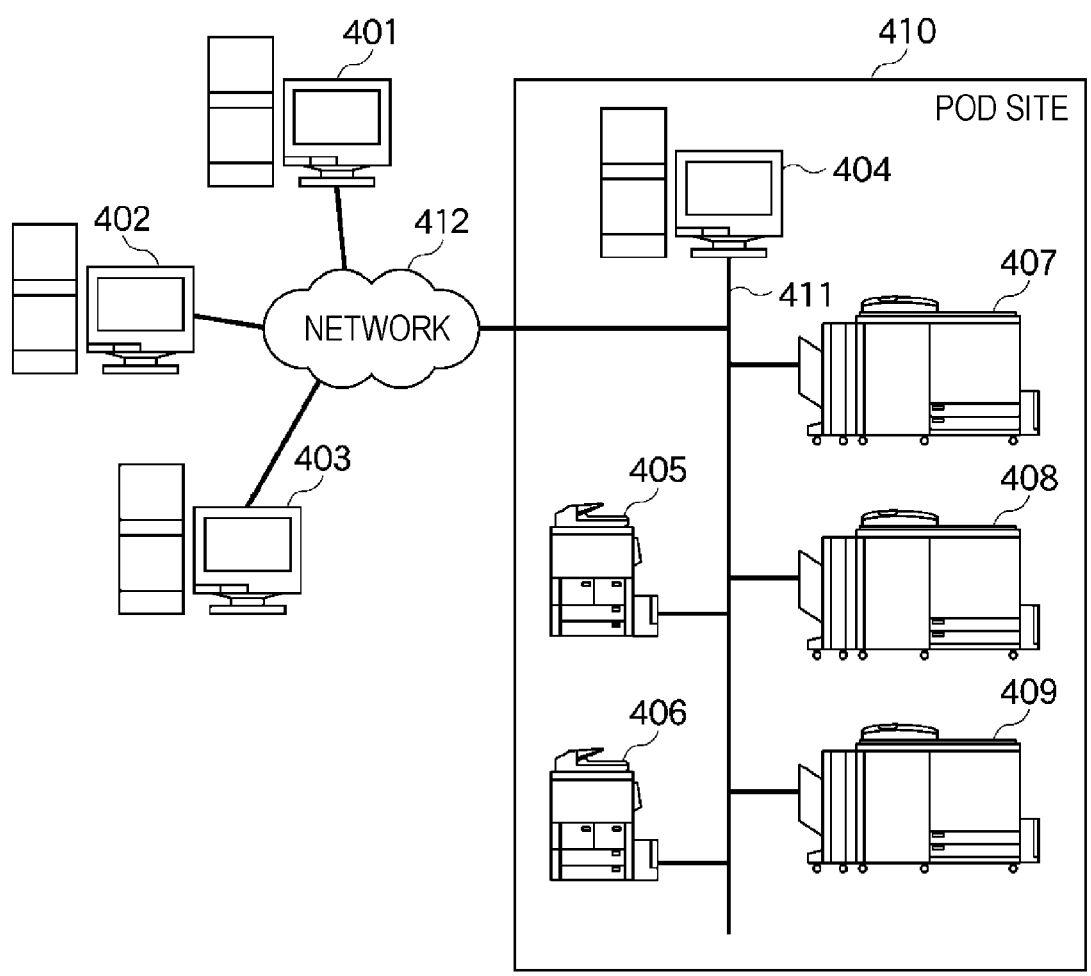
FIG. 1 is a block diagram illustrating a configuration of a printing system according to an exemplary embodiment of the present invention.

Referring to FIG. 1, a configuration of a printing system according to an exemplary embodiment of the present invention is illustrated.

As illustrated in FIG. 1, the printing system includes a plurality of print servers 401, 402, and 403. Each of the print servers 401, 402, and 403 transmits a print job to a printer provided in a POD site 410 via a network 412 such as the Internet.

The POD site 410 serves as a print center managed by a vender which performs printing in accordance with a request from a user or an in-house print center located in a company. In the POD site 410, a dedicated local network 411 is constructed, in which a print server 404 and a plurality of printers 405 to 409 are interconnected. The printers 405 and 406 are black-and-white printers for performing printing of black-and-white images, and the printers 407, 408, and 409 are color printers for performing printing of color images.

Referring to FIG. 2, contents of communication regarding a reservation of substitute printing, which is performed between the print servers 401 to 404, and the black-and-white printers 405 and 406 and the color printers 407 to 409, are described. These print servers 401 to 404 are hereinafter referred to as the print servers when it is not necessary to distinguish them from each other, and the printers 405 to 409 are hereinafter referred to as the printers when it is not necessary to distinguish them from each other. The figure illustrates a list of commands sent and received to and from the printer servers and the printers. The direction in which each of the commands is transmitted (source and destination) is indicated as "S→P" or "P→S". In the figure, "S→P" indicates that a command is sent from any of the print servers to any of the printers. "P→S" indicates that a command is sent from any of the printers to any of the print servers.

The communication commands used for a reservation of substitute printing includes a "printing operation start" command, an "operation end" command, a "substitute printing reserve" command, a "substitute printing reservation response" command, a "substitute printing reservation cancel" command, a "substitute printing reservation cancellation request" command, and a "stability preference" command.

Using the "printing operation start" command, any of the print servers instructs any of the printers to start a printing operation. A print job is sent to the printers together with this "printing operation start" command.

The "operation end" command is to be sent from the printer that has received the "printing operation start" command to the print server from which the "printing operation start" command is sent (the source print server of the "printing operation start" command), when the printer completes the printing operation for the print job. This "operation end" command contains information indicating whether or not the printing operation has been normally completed.

Using the "substitute printing reserve" command, any of the print servers instructs a predetermined printer to waiting for substitute printing in a standby state. This "substitute printing reserve" command contains the priority level of intended substitute printing and the contents of a print job to be reserved (e.g., an operation mode, a type of sheet to be used, and contents in a postprocessing mode).

Using the "substitute printing reservation response" command, the printer, in response to the "substitute printing reserve" command, indicates whether or not the substitute printing reservation made by the "substitute printing reserve" command has been accepted. This command is sent to the source print server of the "substitute printing reserve" command.

Using the "substitute printing reservation cancel" command, the print server stops the printer to which the print server sent the "substitute printing reserve" command (destination printer) from being in a standby state for preparing for substitute printing.

When the printer that has received the "substitute printing reserve" command enters a print disabled state due to an error (e.g., a paper jam), the "substitute printing reservation cancellation request" command is sent back to the source print server of the "substitute printing reserve" command. The print disable state refers to a state in which a printing operation cannot be executed due to, for example, a paper jam which occurs during execution of another print job or due to a certain fault which occurs while in the waiting state. The "substitute printing reservation cancellation request" command contains information indicating the factor which has caused the print disabled state.

Using the "stability preference" command, any of the print servers instructs any of the printers to switch to a stability preference mode in which stability is preferred to productivity in control of the printer. The stability preference mode is a mode in which the jam seldom occurs by slowing down the transporting speed of the sheet.

Now, priority levels which can be contained in the "substitute printing reserve" command will be described with reference to FIG. 3. The figure illustrates the contents of priority levels contained in the "substitute printing reserve" command.

In this exemplary embodiment, three priority levels are defined: Priority Level 1, Priority Level 2, and Priority Level 3. Each priority level is classified in accordance with a corresponding priority value. For example, when the priority value is "1", the priority level is "3". In Priority Level 1, acceptance of the "substitute printing reserve" command and the "printing operation start" command from another print server is inhibited while the printer is in a substitute printing reservation waiting state. In Priority Level 2, acceptance of only a print job in which consumable supplies (e.g., sheets) specified in the "substitute printing reserve" command are not used is allowed while the printer is in a substitute printing reservation waiting state. In Priority Level 3, acceptance of the "substitute printing reserve" command and the "printing operation start" command is allowed while the printer is in the substitute printing reservation waiting state. The setting of the priority level is performed in the printer server. In order to avoid misuse of "Priority Level 1", a password, which is provided to a user in advance, can be input when "Priority Level 1" is set.

The printer, which has received the "substitute printing reserve" command and thus been in the substitute printing reservation waiting state, determines whether a command from another print server can be accepted, in accordance with the priority level contained in the "substitute printing reserve"

command. Alternatively, for example, the printer can determine whether it operates in accordance with the priority level. Further, it can also be configured such that when the printer receives the "substitute printing reserve" command of Priority Level 1, the printer can accept the command only if the "substitute printing reserve" command is sent from a predetermined server.

Figure 4:
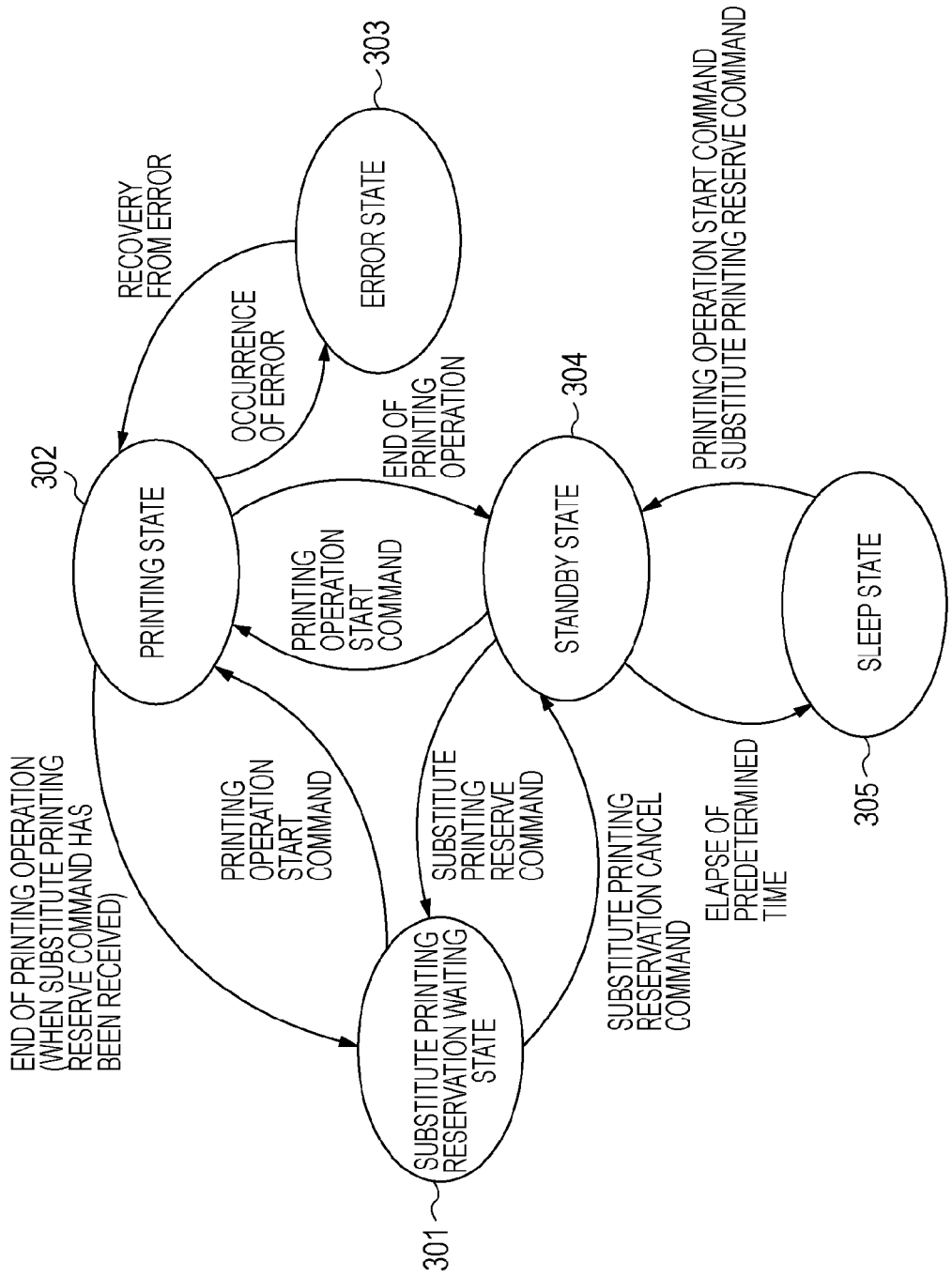
FIG. 4 illustrates a state transition of each printer.

Turning to FIG. 4, control of the black-and-white printers 405 and 406 and the color printers 407 to 409 will be described. FIG. 4 illustrates state transitions of each of the printers.

In present embodiment, any of the printers is initially in a standby state 304, in which no printing operation is performed. When the printer, while in the standby state 304, receives the "printing operation start" command from any of the print servers, the printer transitions to a printing state 302 and starts a printing operation. If an error occurs due to, for example a paper jam, during the printing operation, the printer transitions to an error state 303 and stops the printing operation. When the error is fixed, the printer returns to the printing state 302. When the printing operation is completed, the printer returns to the standby state 304.

When the printer receives the "substitute printing reserve" command while in the standby state 304, the printer transitions to a substitute printing reservation waiting state 301. At this time, the printer stores the priority level and the content of a reserved print job (control information) contained in the "substitute printing reserve" command. When a predetermined time period has elapsed while the printer is in the standby state 304, the printer enters a sleep state 305 and is held in a power-saving state. In this sleep state 305, the amount of energy consumption is less than in the standby state 304. Thus, when the printer receives the "printing operation start" command and the "substitute printing reserve" command, the printer transitions to the standby state 304 and starts a setup operation so as to be operable. However, this setup operation takes a long time. When, the setup operation is completed, the printer changes from being in the standby state 304 to being the printing state 302, if the received command is the "printing operation start" command. On the other hand, if the received command is the "substitute printing reserve" command, the printer changes from being in the standby state 304 to the substitute printing reservation waiting state 301.

The printer does not enter the sleep state 305 while in the substitute printing reservation waiting state 301. This allows the printer to immediately start substitute printing when it is instructed to perform the substitute printing. When the printer receives the "printing operation start" command while in the substitute printing reservation waiting state 301, the printer starts a printing operation in accordance with the priority level contained in the "substitute printing reserve" command. In this case, the printer enters the printing state 302.

When the printer receives the "substitute printing reservation cancel" command from the source print server of the "substitute printing reserve" command, the printer cancels the substitute printing reservation made by the source print server. At this time, if all substitute printing reservations stored in the printer have been canceled, the printer enters the standby state 304. On the other hand, when the printer receives the "substitute printing reserve" command while in the printing state 302, the printer enters the substitute printing reservation waiting state 301 after the printing operation in progress is completed.

Thus, each of the printers 405 to 409 performs the above-described state transitions and control in accordance with the state transitions.

Now, control of a substitute printing reservation performed in a printer according to the present embodiment will be described in detail with reference to flowcharts in FIGS. 5 to 7. The flowcharts illustrate a processing procedure of control of a substitute printing reservation made for any of the printers included in the printing system shown in FIG. 1.

Figure 5:
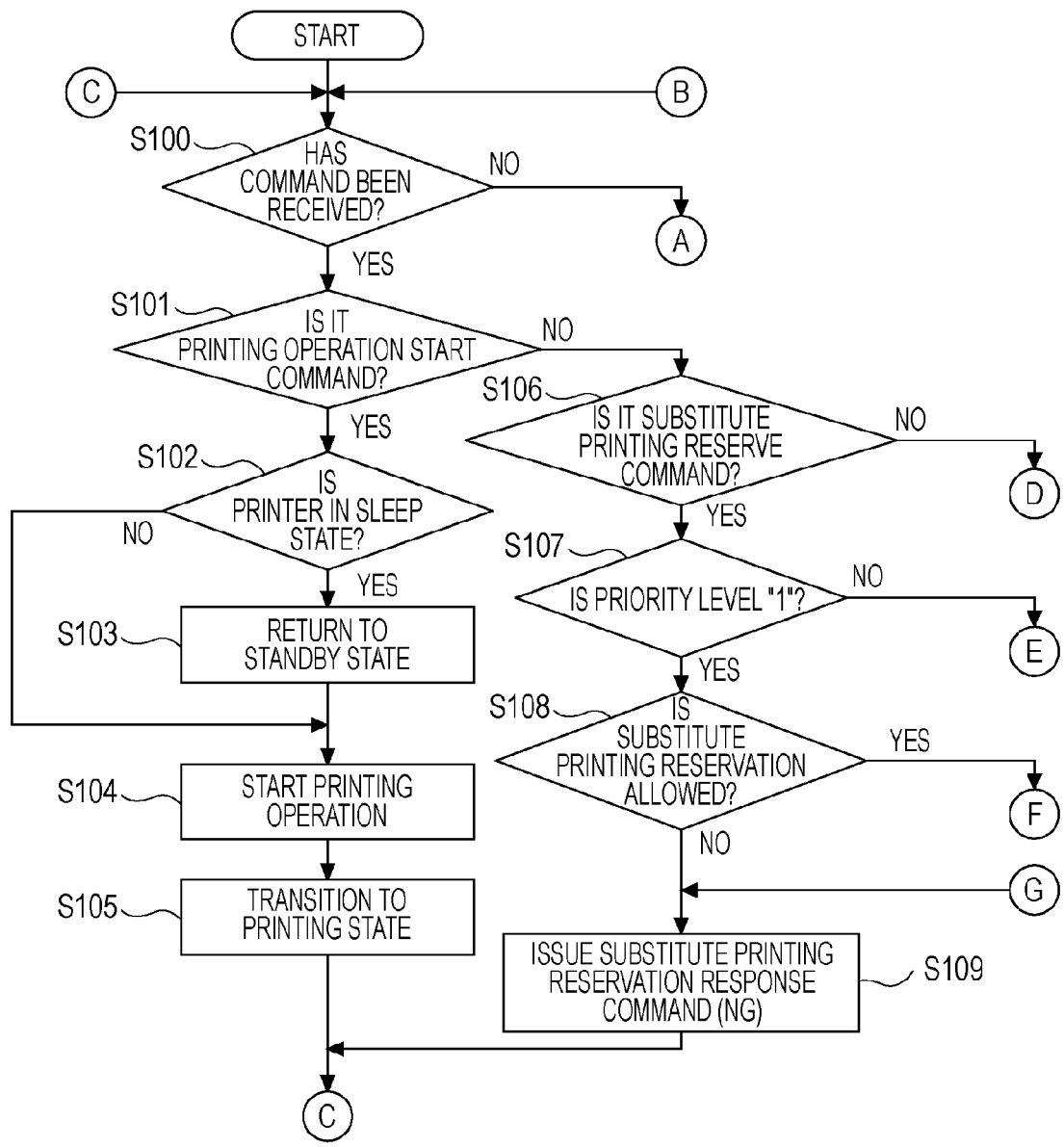
FIG. 5 is a flowchart illustrating a procedure of control of substitute printing reservation performed in a printer in a printing system illustrated in FIG. 1.

As illustrated in FIG. 5, the printer determines whether a command has been received from any of the print servers in the printing system at STEP S100. Note that the command is any of the commands illustrated in FIG. 2. If it is determined that the command has been received, the printer then determines whether the received command is the "printing operation start" command at STEP S101. In this step, if it is determined that the received command is the "printing operation start" command, the printer determines whether it is in the sleep state 305 at STEP S102.

If, in STEP S102, the printer is determined to be in the sleep state, the printer returns to the standby state at STEP S103, and then starts a printing operation at STEP S104. Then, the printer enters the printing state at STEP S105, and then the procedure returns to STEP S100. On the other hand, if in STEP S102, the printer is determined to not be in the sleep state, the printer skips the processing of STEP S103 and starts the printing operation at STEP S104. At STEP S105, the printer transitions to the printing state, and the procedure returns to STEP S100.

If, in STEP S101, the received command is determined not to be the "printing operation start" command, the printer then determines whether the received command is the "substitute printing reserve" command at STEP S106. In this step, if it is determined that the received command is the "substitute printing reservation", the printer then determines whether the priority level contained in the "substitute printing reserve" command is Priority Level 1 at STEP S107. In this step, if it is determined that the priority level is Priority Level 1, the printer then determines whether a substitute printing reservation using the "substitute printing reserve" command is allowed at STEP S108. This determination process is performed on the basis of whether the substitute printing reservation of Priority Level 1 has already been set in the printer. In addition, a condition as to whether the "substitute printing reserve" command is sent from a predetermined print server can also be applied to the determination process.

If, in STEP S108, it is determined that the substitute printing reservation using the "substitute printing reserve" command is not allowed, the printer then issues the "substitute printing reservation response" command indicating that the substitute printing reservation using the received "substitute printing reserve" command is not allowed at STEP S109. This "substitute printing reservation response" command is sent to the source print server of the "substitute printing reserve" command. Then the procedure returns to STEP S100.

Figure 6:
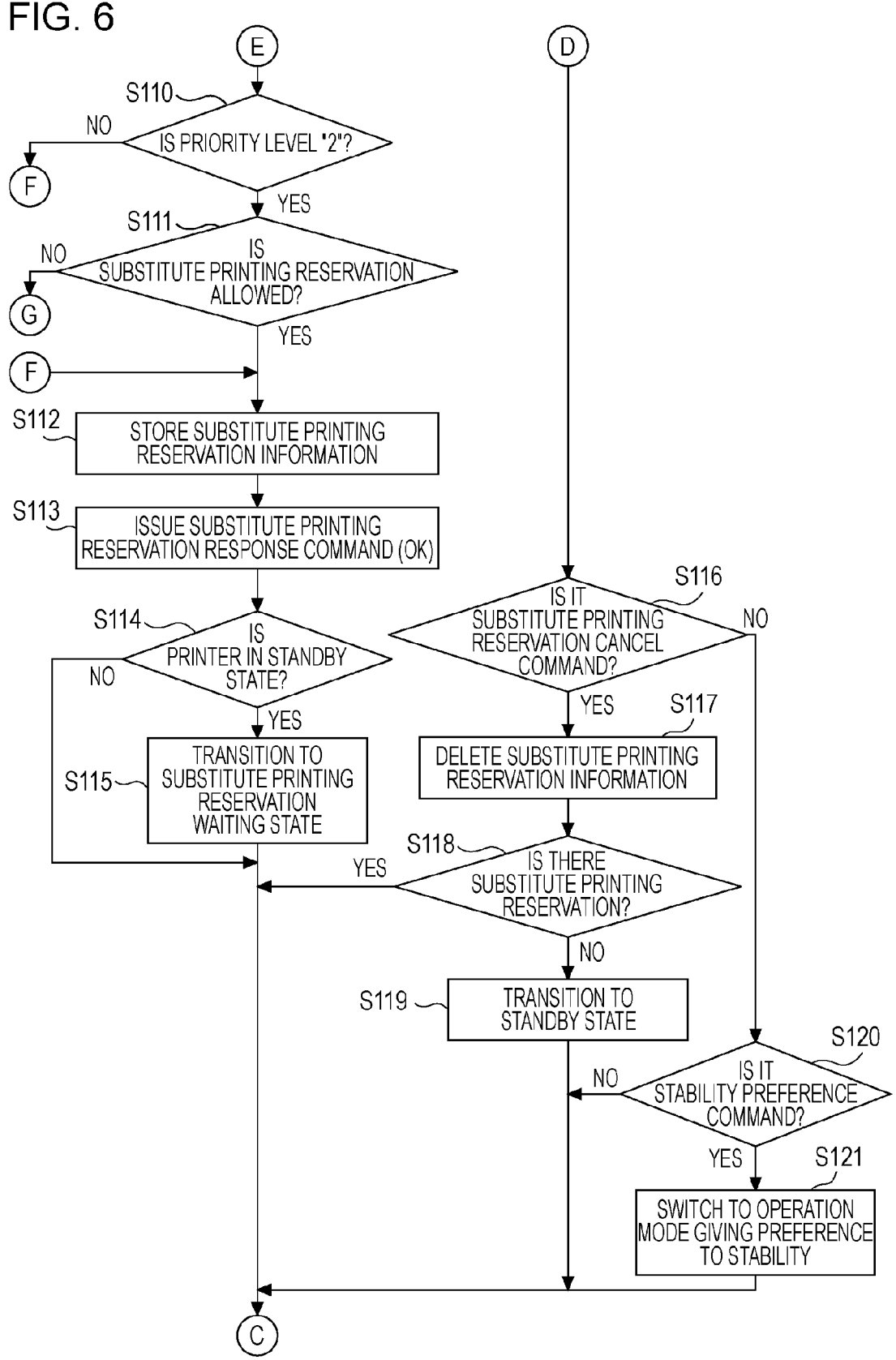
FIG. 6 is a flowchart illustrating a procedure of control of substitute printing reservation performed in a printer in a printing system illustrated in FIG. 1.

If, in STEP S108, it is determined that the substitute printing reservation using the "substitute printing reserve" command is allowed, the printer then stores in a memory the priority level and the content of a print job to be reserved, which are contained in the "substitute printing reserve" command, at STEP S112 (FIG. 6). Then, the printer issues the "substitute printing reservation response" command indicating the substitute printing reservation using the "substitute printing reserve" command is allowed at STEP S113. This "substitute printing reservation response" command is sent to the source print server of the "substitute printing reserve" command. Subsequently, the printer determines whether it is in the standby state at STEP S114. If it is determined that the printer is in the standby state, the printer then transitions to the substitute printing reservation waiting state at STEP S115.

Then the procedure returns to STEP S100. If, in STEP S114, it is determined that the printer is not in the standby state, the processing of STEP S115 is skipped. Then, the procedure returns to STEP S100.

If, in STEP S107, the priority level is determined not to be Priority Level 1, the printer determines the priority level is Priority Level 2 at STEP S110 (FIG. 6). In this step, if the priority level is determined to be Priority Level 2, the printer determines whether a substitute printing reservation for the "substitute printing reserve" command of Priority Level 2 is allowed at STEP S111. This determination process is performed on the basis of whether the type of sheet loaded in the printer is the same as the type of sheet (e.g., consumable supplies), of which the use is specified in the contents of print job to be reserved that is included in the "substitute printing reserve" command, and also the number of the sheets loaded in the printer satisfies the number of the sheets specified in the command.

If, in STEP S111, it is determined that the substitute printing reservation using the "substitute printing reserve" command is not allowed, the procedure proceeds to the STEP S109. On the other hand, if it is determined that the substitute printing reservation using the "substitute printing reserve" command is allowed, procedure proceeds to STEP S112. If, in STEP S110, it is determined that the priority level is not Priority Level 2, i.e., the priority level is Priority Level 3, the procedure skips to STEP S112.

If, in STEP S106, it is determined that the received command is not the "substitute printing reserve" command, the printer determines whether the received command is the "substitute printing reservation cancel" command at STEP S116 (FIG. 6). In this step, if it is determined that the received command is the "substitute printing reservation cancel" command, the printer deletes the priority level of the substitute printing reservation and the contents of the print job which have been stored in the memory at STEP S117.

Subsequently, the printer determines the presence or absence of a substitute printing reservation which has been requested from any of the print servers other than the source print server of the "substitute printing reservation cancel" command at STEP S118. If it is determined that such a substitute printing reservation is not present, the printer transitions to the standby state at STEP S119, and then the procedure returns to STEP S100. On the other hand, if it is determined that such a substitute printing reservation is present, the procedure returns directly to STEP S100.

If, in STEP S116, it is determined that the received command is not the "substitute printing reservation cancel" command, the printer determines that the received command is the "stability preference" command at STEP S120. In this step, if it is determined that the received command is not the "stability preference" command, it is indicated that the received command is an undefined command (not shown), and the procedure returns to STEP S100. On the other hand, if it is determined that the received command is the "stability preference" command, the printer switches to the stability preference mode in which stability is preferred to productivity in printing operations at STEP S121. The stability preference mode is a mode in which the jam seldom occurs by slowing down the transporting speed of the sheet. Then, the procedure returns to STEP S100.

Figure 7:
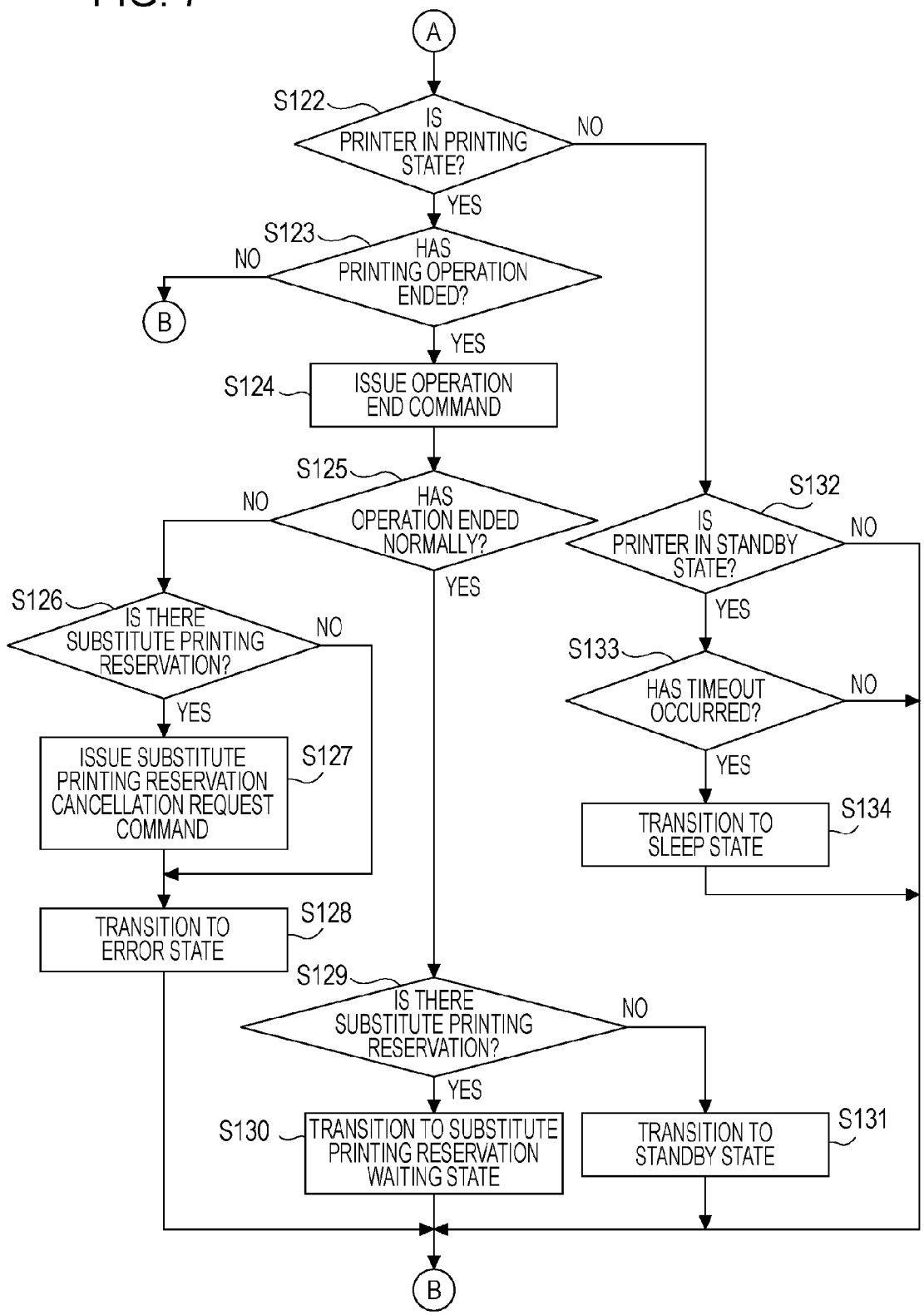
FIG. 7 is a flowchart illustrating a procedure of control of substitute printing reservation performed in a printer in a printing system illustrated in FIG. 1.

In STEP S100, if it is determined that no command has been received from the print server, the printer determines whether it is in the printing state, at STEP S122 (FIG. 7). If, in STEP S122, it is determined that the printer is in the printing state, the printer then determines whether the printing operation has ended at STEP S123. If, in STEP S123, it is determined that the printing operation has not ended, the procedure returns to STEP S100 so that the printer monitors the presence or absence of reception of a command in a printing state.

On the other hand, if in STEP S123 it is determined that the printing operation has ended, the printer issues the "operation end" command which contains information indicating whether the printing operation has ended normally at STEP S124. Using this command, the printer determines whether the printing operation has ended normally at STEP S125. If, in STEP S125, it is determined that the printing operation has not ended normally, the printer determines whether a substitute printing reservation has been stored at STEP S126. In this step, if it is determined that there is a substitute printing reservation, the printer issues the "substitute printing reservation cancellation request" command at STEP S127, and then enters the error state at STEP S128. Then, the procedure returns to STEP S100. On the other hand, if in STEP S126 it is determined that there is no substitute printing reservation, the procedure skips directly to STEP S128, and the printer enters the error state. Then the procedure proceeds to STEP S100.

If, in STEP S125, it is determined that the printing operation has ended normally, the printer determines whether a substitute printing reservation has been stored at STEP S129. If, in STEP S129, it is determined that a substitute printing reservation has been stored, the printer transitions to the substitute printing reservation waiting state at STEP S130. Then the procedure returns to STEP S100. On the other hand, if in STEP S129 it is determined that no substitute printing reservation has been stored, the printer transitions to the standby state at STEP S131. Then, the procedure returns to STEP S100.

If, in STEP S122, it is determined that the printer is not in the printing state, the printer determines whether it is in the standby state at STEP S132. In this step, if it is determined that the printer is in the standby state, the printer then determines whether a predetermined time period has elapsed since the printer entered the standby state at STEP S133. If, in STEP S133, it is determined that the predetermined time period has elapsed, the printer transitions to the sleep state at STEP S134. Then, the procedure returns to STEP S100.

If, in STEP S133, it is determined that the predetermined time period has elapsed, the printer continues to be in the standby state, and the procedure returns to STEP S100. If, in STEP S132, it is determined that the printer is not in the standby state, the procedure returns to STEP S100.

Now, referring to flowcharts illustrated in FIGS. 8 to 10, control of a substitute printing reservation will be described. These flowcharts illustrate a processing procedure of control of a substitute printing reservation which is performed by any of the print servers 401 to 404 in the printing system described using FIG. 1.

Figure 8:
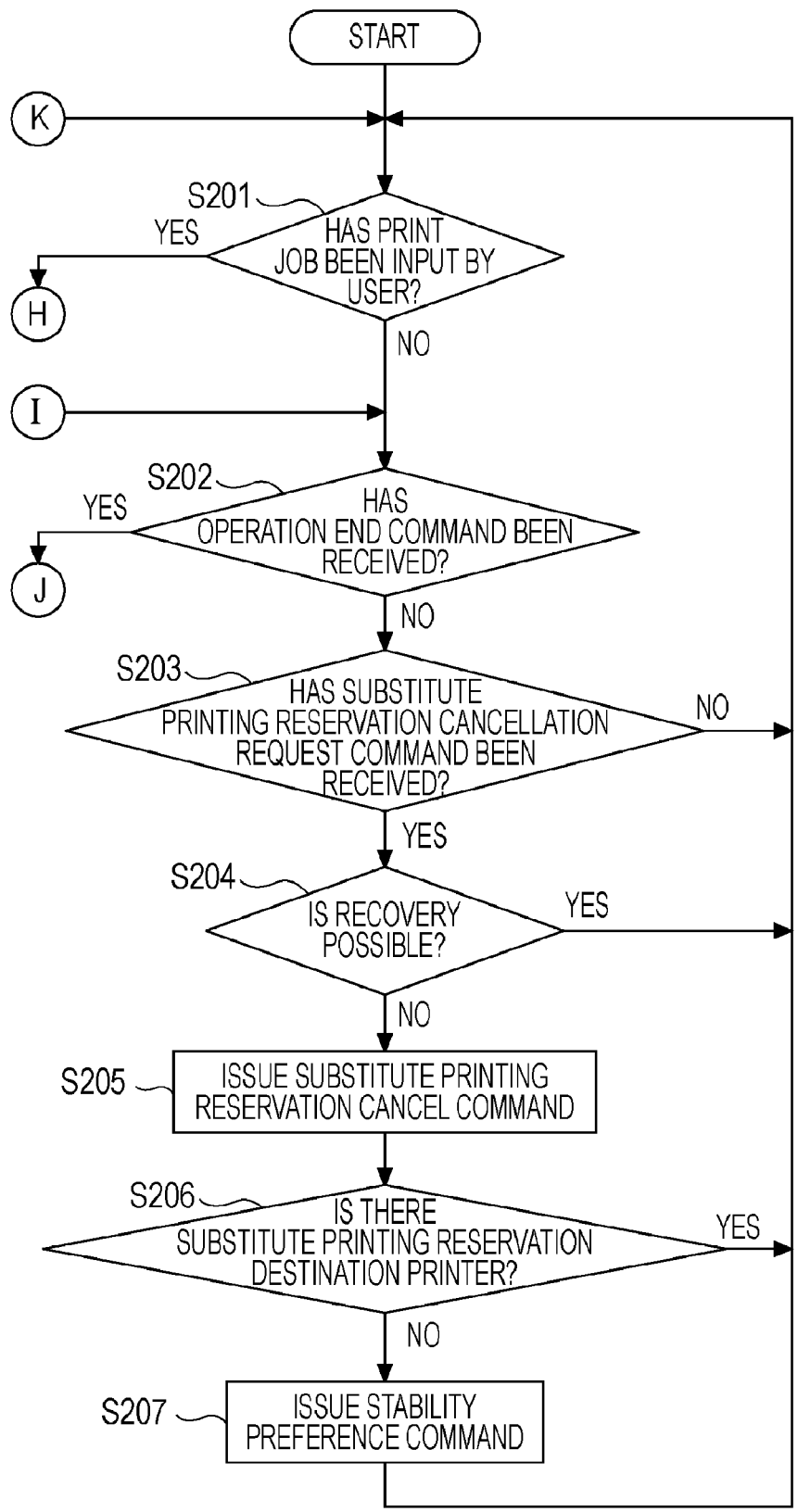
FIG. 8 is a flowchart illustrating a procedure of control of substitute printing reservation performed in a print server in a printing system illustrated in FIG. 1.

As illustrated in FIG. 8, the print server determines whether or not a print job has been input by a user at STEP S201. In this step, if it is determined that no print job has been input by a user, the print server determines whether the "operation end" command has been received from any of the printers in the system to which the print server has sent the "printing operation start" command (the destination printer or any of the printers for which a substitute printing reservation has been made (substitute printing reservation destination printer) at STEP S202.

If, in STEP S202, it is determined that the "operation end" command has not been received, the print server determines whether the "substitute printing reservation cancellation request" command has been received at STEP S203. In this step, if it is determined that the "substitute printing reservation cancellation request" command has not been received, the procedure returns to STEP S201.

Figure 10:
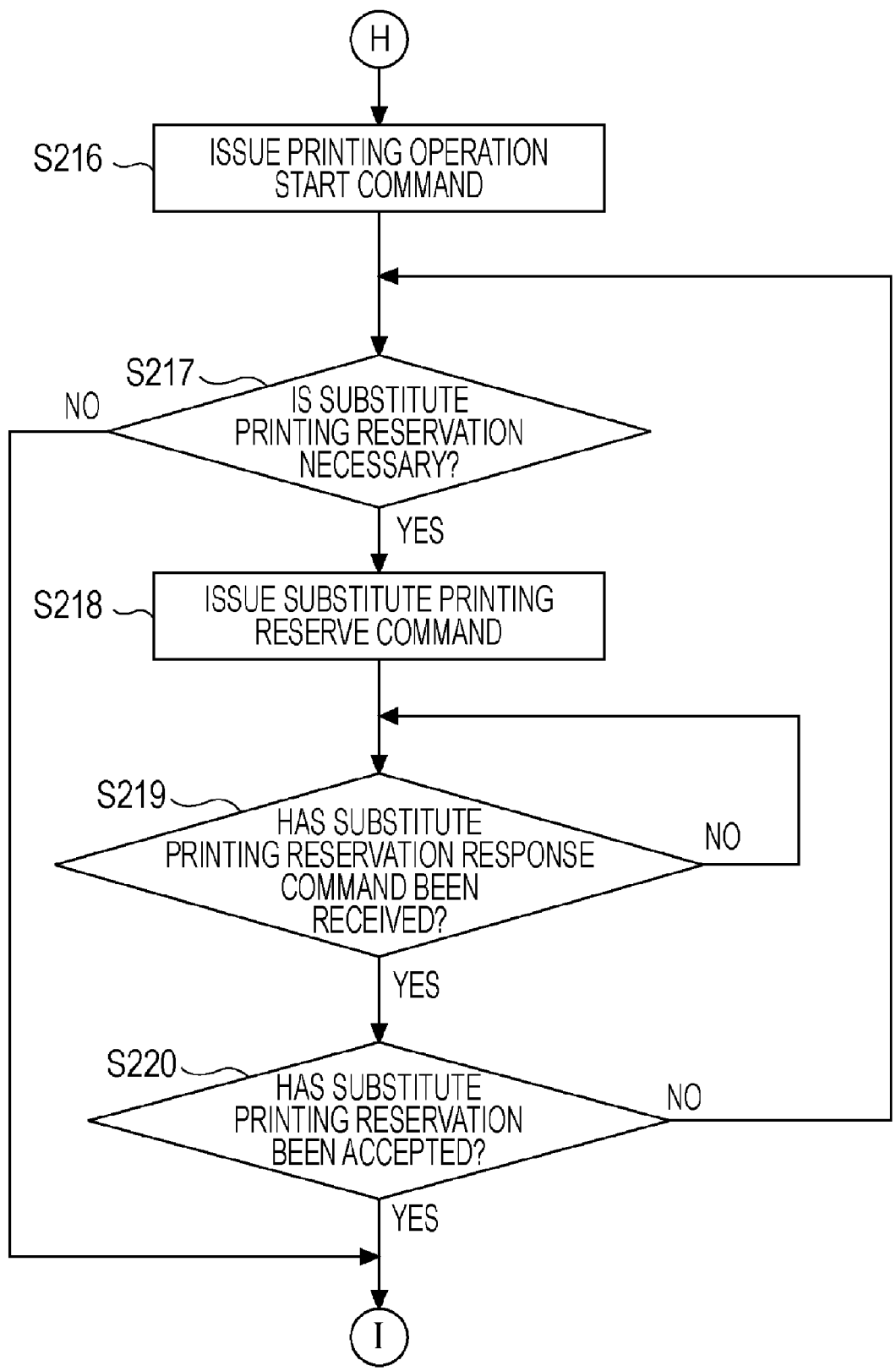
FIG. 10 is a flowchart illustrating a procedure of control of substitute printing reservation performed in a print server in a printing system illustrated in FIG. 1.

If, in STEP S201, it is determined that a print job has been input by a user, the print server selects a printer in the system in which the input print job is to be processed and sends the "printing operation start" command to the selected printer at STEP S216 (FIG. 10). Next, the print serves determines whether a substitute printing reservation is necessary at STEP S217. In this step, if it is determined that a substitute printing reservation is necessary, the print server sends the "substitute printing reserve" command to a printer which can be used for a substitute printing reservation (a substitute printing reservation candidate printer) at STEP S218. This substitute printing reservation candidate printer can serve as a substitute for the destination printer of the "printing operation start" command. Specifically, the substitute printing reservation candidate printer has functions similar to those of the destination printer of "printing operation start" command. If, in STEP S217, it is determined that a substitute printing reservation is not necessary, the procedure skips to STEP S202.

Subsequently, the print server waits for the "substitute printing reservation response" command to be replied to by the substitute printing reservation candidate printer at STEP S219. Upon receiving the "substitute printing reservation response" command, the print server determines on the basis of the received "substitute printing reservation response" command whether the substitute printing reservation has been accepted at STEP S220. In this step, if it is determined that the substitute printing reservation has not been accepted by the substitute printing reservation candidate printer, the procedure returns to STEP S217, in which the print server determines whether a substitute printing reservation is necessary. On the other hand, if in STEP S220, it is determined that the substitute printing reservation has been accepted by the substitute printing reservation candidate printer, the procedure proceeds to STEP S202. In addition, in the processing of STEP S218, if no substitute printing reservation candidate printer is found, the procedure also proceeds to STEP S202 (not illustrated in FIG. 10).

Figure 9:
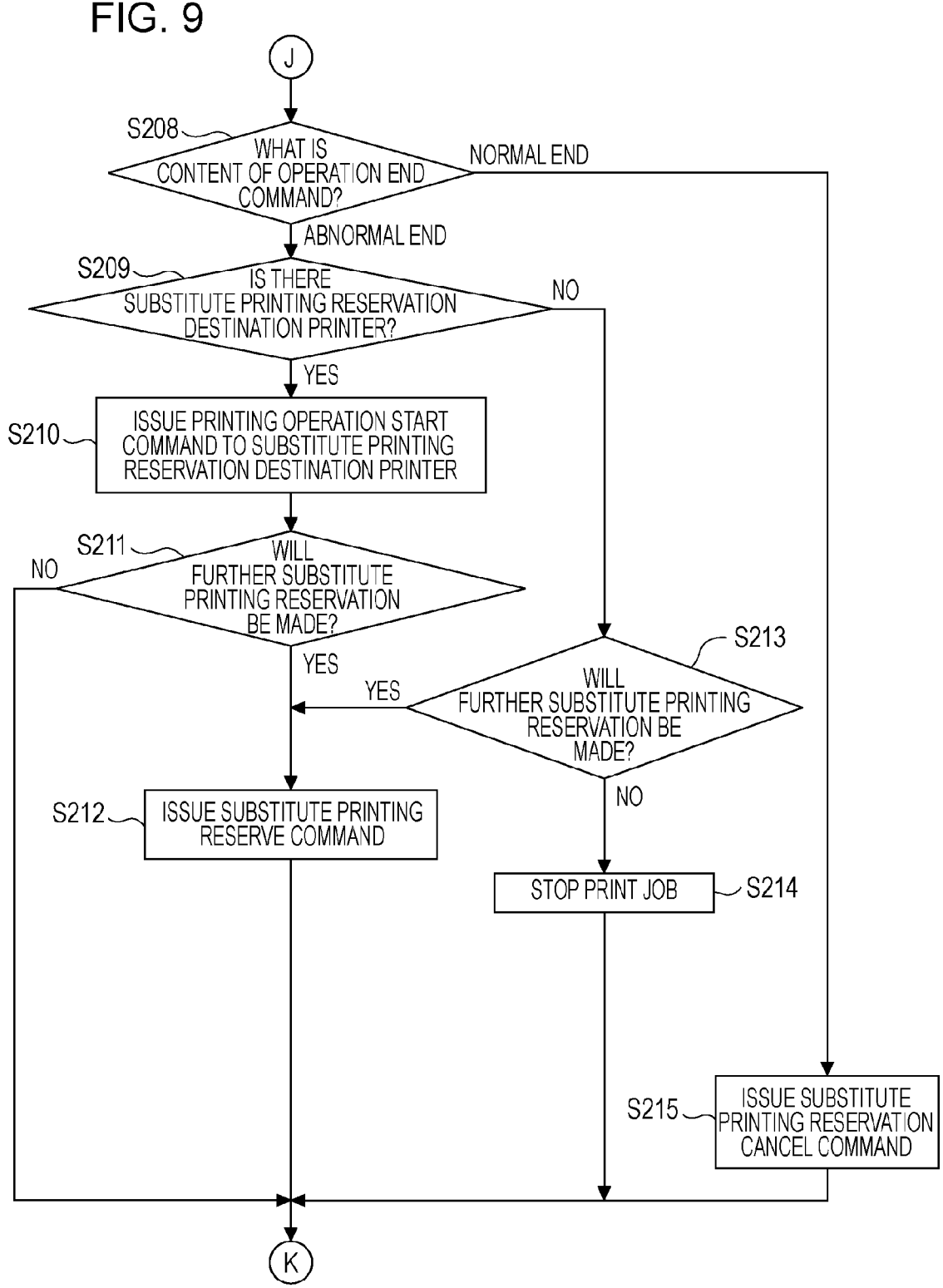
FIG. 9 is a flowchart illustrating a procedure of control of substitute printing reservation performed in a print server in a printing system illustrated in FIG. 1.

In STEP S202, if it is determined that the "operation end" command has been received from the printer described above, the print server determines on the basis of the "operation end" command whether the end of the printing operation is "normal end" or "abnormal end" at STEP S208 (FIG. 9). Note that the source printer of this "operation end" command is either the destination printer of the "printing operation start" command or any substitute printing reservation destination printer.

If, in STEP S208, it is determined that the end of the printing operation is "normal end", the print server issues and sends the "substitute printing reservation cancel" command to a substitute printing reservation destination printer at STEP S215. Note that the destination of this "substitute printing reservation cancel" command is any substitute printing reservation destination printer except the source printer of "operation end" command described above. Then, the procedure returns to STEP S201.

If, in STEP S208, it is determined that the end of the printing operation is the "abnormal end", the print server determines whether there is any substitute printing reservation destination printer at STEP S209. In this step, in the case where the "operation end" command has been sent from the substitute printing reservation destination printer, the determination is performed as to whether there is another substitute printing reservation destination printer.

If, in STEP S209, it is determined that there is a substitute printing reservation destination printer, the print server issues and sends the "printing operation start" command to the substitute printing reservation at STEP S210. Then, the print server determines whether to make a further substitute printing reservation to another printer at STEP S211. This determination is based on the number of remaining sheets used in the destination printer of the "printing operation start" command and on the time necessary to terminate the printing operation. If, in STEP S211, it is determined that no further substitute printing reservation is made to another printer, the procedure returns to STEP S201. On the other hand, if it is determined that a substitute printing reservation is to be made to another printer, the print server issues and sends the "substitute printing reserve" command to the other printer at STEP S212. Then, the procedure retunes to STEP S201.

If, in STEP S209, it is determined that there is no substitute printing reservation destination printer, the print server determines whether to make a further substitute printing reservation to another printer at STEP S213. In this step, if it is determined that no further substitute printing reservation is to be made to another printer, it is not possible to continue the process for the print job. Thus, the print server stops the print job and notifies the user of the stopped print job at STEP S214. Then the procedure returns to STEP S201. On the other hand, if in STEP S213 it is determined that a further substitute printing reservation is to be made to another printer, the procedure proceeds to STEP S212.

In STEP S202, if it is determined that no "operation end" command has been received from the printer, the print server determines the presence or absence of the "substitute printing reservation cancellation request" command from the substitute printing reservation destination printer at STEP S203. In this step, if it is determined that the "substitute printing reservation cancellation request" command has been received, the print server determines whether the factor which has caused the cancellation of the substitute printing reservation can be immediately removed so that the printer recovers and resumes the operation at STEP S204. The factor which has caused the cancellation of the substitute printing reservation is recognized on the basis of the "substitute printing reservation cancellation request" command.

If, in STEP S204, it is determined that immediate recovery of the printer is possible, the procedure returns to STEP S201. At this time the printer ignores the "substitute printing reservation cancellation request" command and waits for the "operation end" command from the printer which is currently in operation. On the other hand, if in STEP S204, it is determined that the immediate recovery of the printer is not possible, the print server issues and sends the "substitute printing reservation cancel" command to the source printer of the "substitute printing reservation cancellation request" command at STEP S205.

Subsequently, the print server determines whether there is a substitute printing reservation destination printer other than the currently operating printer at STEP S206. In this step, if it is determined that there is a substitute printing reservation destination printer other than the currently operating printer, the procedure returns to STEP S201. On the other hand, if in STEP S206 it is determined that there is not such a substitute printing reservation destination printer, the print server issues and sends the "stability preference" command to the currently operating printer at STEP S207. This processing is performed in order to avoid an error in the currently operating printer. In other words, if an error occurs in the currently operating printer, the print job has to be terminated since there are no other printers which can take over and execute the print job. Thus, the currently operating printer is switched to the operation mode in which stability is preferred to productivity by sending the "stability preference" command. Then, the procedure returns to STEP S201.

Figure 11:
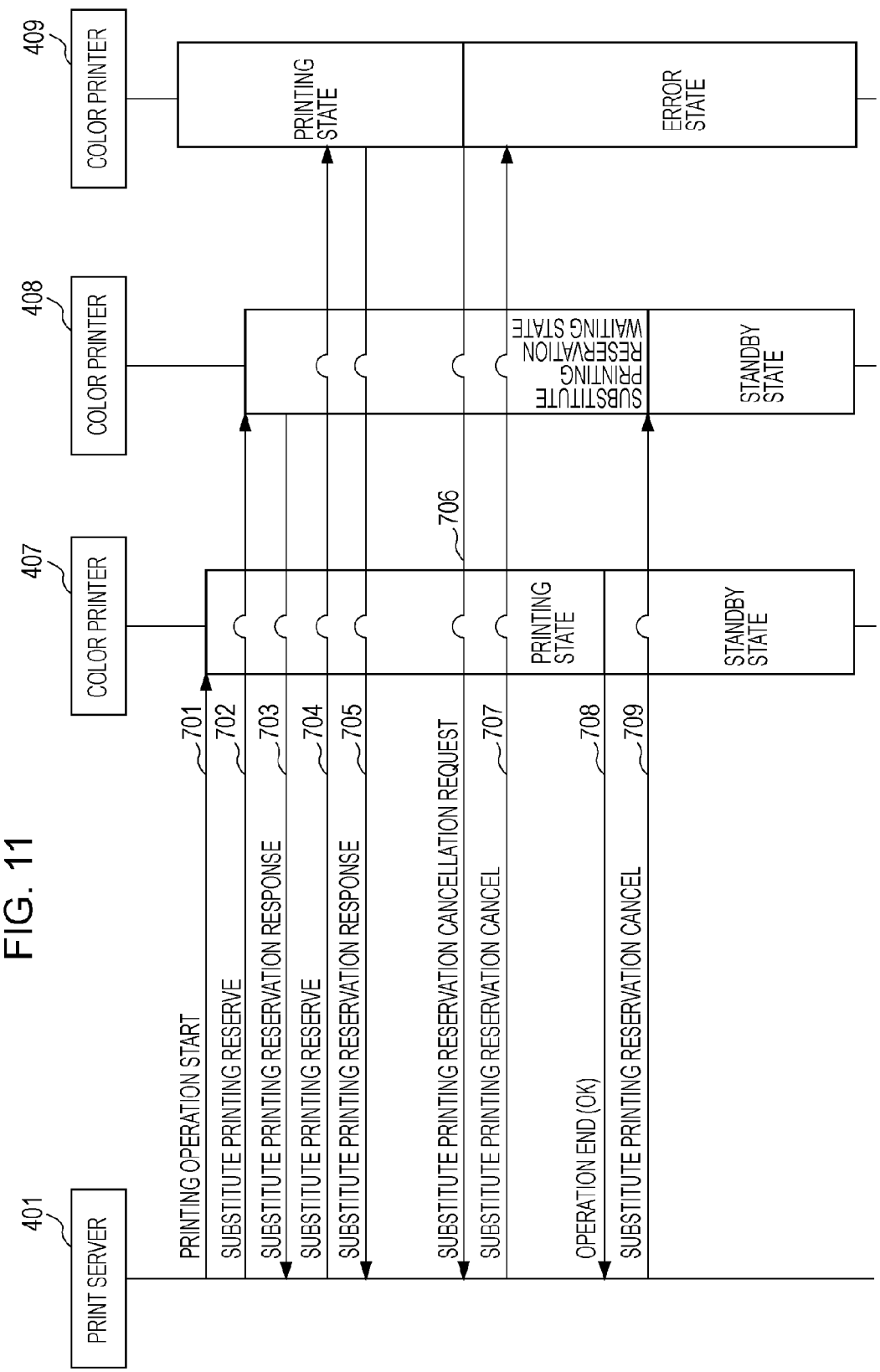
FIG. 11 is a sequence diagram illustrating processing performed when a substitute printing reservation is made from a print server to a plurality of color printers in a printing system illustrated in FIG. 1.

Referring now to FIG. 11, a sequence diagram illustrates exemplary processing performed when a substitute printing reservation is made from the print server 401 to the plurality of color printers 407 to 409.

As illustrated in FIG. 11, when the print server 401 sends a "printing operation start" command 701 to the color printer 407, the color printer 407 starts a printing operation and thus enters the printing state. Subsequently, the print server 401 sends a "substitute printing reserve" command 702 to the color printer 408. As a result, the color printer 408 enters the substitute printing reservation waiting state and replies to the print server 401 with a "substitute printing reservation response" command 703.

The print server 401 also sends a "substitute printing reservation" 704 to the color printer 409, which is executing a print job, i.e., currently engaged in a printing operation. In response to the "substitute printing reserve" command 704, the color printer 409 sends a "substitute printing reservation response" command 705 to the print server 401. The color printer 409 enters the substitute printing reservation waiting state after it completes the ongoing print job.

At this time if an error, such as a paper jam, occurs in the color printer 409 during the printing operation, the color printer 409 sends a "substitute printing reservation cancellation request" command 706 to the print server 401. With the occurrence of the error, the color printer 409 transitions to the error state. Upon receiving the command 706, the print server 401 sends the color printer 409 a "substitute printing reservation cancel" command 707. Upon receiving the "substitute printing reservation cancel" command 707, the color printer 409 deletes information on the substitute printing reservation which has been stored in a memory.

On the other hand, if a printing operation based on the "printing operation start" command has been ended satisfactorily without an error in the color printer 407, the color printer 407 sends an "operation end" command 708 to the print server 401. Upon receiving the command 708, the print server 401 sends a "substitute printing reservation cancel" command 709 to the color printer 408. Upon receiving the command 709, the color printer 408 transitions from the substitute printing reservation waiting state to the standby state.

Figure 12:
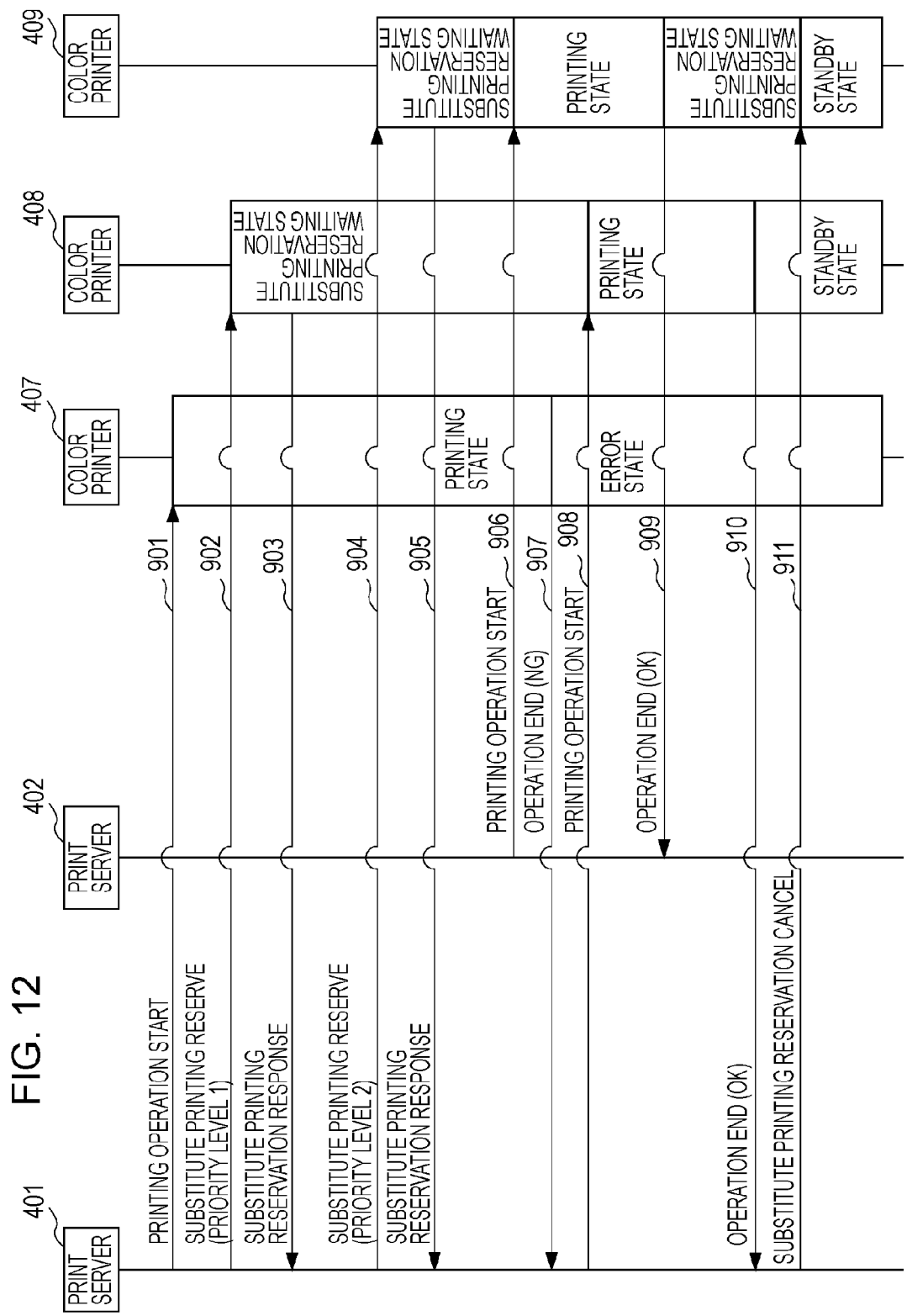
FIG. 12 is a sequence diagram illustrating processing performed when a substitute printing reservation is made from a plurality of print servers to a plurality of color printers in a printing system illustrated in FIG. 1.

Referring to FIG. 12, a sequence diagram illustrates processing performed when a substitute printing reservation is made from a plurality of print servers (the print servers 401 and 402) to a plurality of color printers (the color printers 407 to 409).

As illustrated in FIG. 12, when a "printing operation start" command 901 is sent from the print server 401 to the color printer 407, the color printer 407 starts a printing operation and thus enters the printing state. At this time, it is assumed that the print server 401 sends the color printer 408 a "substitute printing reservation" 902 of Priority Level 1. Then, in response to the "substitute printing reserve" command 902, the color printer 408 sends the print server 401 a "substitute printing reservation response" command 903. Thus, the color printer 408 enters the substitute printing reservation waiting state so as to wait for a "printing operation start" command from the print server 401.

At this time, it is assumed that the print server 401 also sends the color printer 409 a "substitute printing reserve" command 904 of Priority Level 2. Then, the color printer 409 replies the print server 401 with a "substitute printing reservation response" command 905. Then, the color printer 409 enters the substitute printing reservation waiting state so as to wait for a command from the print server 401 or the print server 402.

Now, it is assumed that the printer server 402 sends the color printer 409 a "printing operation start" command 906. At this time, since the color printer 409 is in the substitute printing reservation waiting state according to Priority Level 2, the color printer 409 can accept the "printing operation start" command from the print server 402. Thus, the color printer 409 transitions from the substitute printing reservation waiting state to the printing state to accept the print job sent from the print server 402.

If an error occurs in the color printer 407, which received the "printing operation start" command 901, the color printer 407 sends the print server 401 an "operation end" command 907 indicating the occurrence of the error. Upon receiving the "operation end" command 907, the print server 401 sends a "printing operation start" command 908 to the color printer 408, which is one of the substitute printing reservation destination printers. Upon receiving the "printing operation start" command 908, the color printer 408 immediately starts the printing operation.

Upon completing the print job instructed by the print server 402, the color printer 409 sends an "operation end" command 909 to the print server 402. Then, the color printer 409 transitions to the substitute printing reservation waiting state again to prepare for a "printing operation start" command to be sent from the print server 401.

When the color printer 408 completes the print job, the color printer 408 sends the print server 401 an "operation end" command 910. Then, the print server 401 sends a "substitute printing reservation cancel" command 911 to the color printer 409 which has not used for the print job associated with the print server 401.

As described above, when execution of a print job is instructed from any of the print servers in the system to one of the printers in the POD site 410, the print server sends a "substitute printing reserve" command to another printer which can substitute for the instructed printer. The printer which has received the "substitute printing reserve" command (substitute printing reservation destination printer) enters the substitute printing reservation waiting state for waiting to start the print job to be executed by the instructed printer. With this arrangement, even when an error occurs which disables the instructed printer from executing the print job, the print job can be immediately resumed by sending a "printing operation start" command to the substitute printing reservation destination printer that is in the substitute printing reservation waiting state.

Accordingly, a substitute printing environment can be provided which, when a printer fails to execute an instructed print job, enables another printer to execute the print job in place of the failed printer.

In addition, when the "print operation start" command is sent to a printer, the "substitute printing reserve" command is also sent to another printer serving as a substitute for the printer. This facilitates selection of a substitute printing reservation destination printer.

If there is no printer for which substitute printing reservation can be made, the operation mode of a currently operating printer is switched to the stability priority mode. The stability preference mode is a mode in which the jam seldom occurs by slowing down the transporting speed of the sheet. This significantly reduces the possibility of occurrence of an error in the currently operating printer, and thus to a great extent, interruption of a print job can be avoided.

Moreover, each "substitute printing reserve" command contains one of the three priority levels (i.e., Priority Level 1 to Priority Level 3), thus the availability of each substitute printing reservation destination printer can be appropriately determined.

In the present exemplary embodiment, the printing system having the configuration illustrated in FIG. 1 is described. However, the printing system according to the present exemplary embodiment is not limited to the above configuration. For example, a printing system including one print server and a plurality of printers can also be applied to implement the present invention. Any system configuration that would enable practice of the present invention is applicable.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-366419 filed on Dec. 20, 2005, which is hereby incorporated by reference herein in its entirety.

What is claimed is:

1. A printing system comprising:
   a plurality of printing apparatuses connected to a network; and
   at least one control apparatus, wherein the control apparatus sends a print job to at least one printing apparatus of the plurality of printing apparatuses and instructs the at least one printing apparatus to execute the print job,
   wherein when a first printing apparatus from among the plurality of printing apparatuses is instructed to execute the print job, the control apparatus makes a substitute printing reservation for at least one second printing apparatus, wherein the substitute printing reservation allows the at least one second printing apparatus to execute the print job instead of the first printing apparatus,
   wherein the at least one second printing apparatus for which the substitute printing reservation has been made is set to a waiting state for waiting to execute the print job instead of the first printing apparatus,
   wherein the at least one second printing apparatus for which the substitute printing reservation has been made is held in the waiting state for waiting to execute the print job instead of the first printing apparatus until the substitute printing reservation is canceled by the control apparatus,
   wherein when the at least one second printing apparatus for which the substitute printing reservation has been made enters a state in which a printing operation is disabled before the substitute printing reservation is canceled by the control apparatus, the at least one second printing apparatus requests the control apparatus to cancel the substitute printing reservation, and
   wherein in response to a request for cancellation of the substitute printing reservation, the control apparatus cancels the substitute printing reservation for the at least one second printing apparatus that requested the cancellation of the substitute printing reservation and makes a substitute printing reservation for another printing apparatus.

2. The printing system according to claim 1,
   wherein when the substitute printing reservation is made for the at least one second printing apparatus, the control apparatus sends control information of the print job to the at least one second printing apparatus.

3. The printing system according to claim 1,
   wherein when the first printing apparatus completes the print job, the control apparatus cancels the substitute printing reservation made for the at least one second printing apparatus.

4. The printing system according to claim 1,
   wherein when the at least one second printing apparatus executes the print job instead of the first printing apparatus, the control apparatus cancels substitute printing reservations made for any other printing apparatuses.

5. The printing system according to claim 1,
   wherein when the first printing apparatus does not complete the print job, the control apparatus sends the print job to the at least one second printing apparatus for which the substitute printing reservation has been made and instructs the at least one second printing apparatus to execute the print job.

6. The printing system according to claim 1,
   wherein if no printing apparatus is substituted for the first printing apparatus when the print job is started by one of the first printing apparatus and the at least one second printing apparatus for which the substitute printing reservation has been made, the control apparatus switches an operation mode of one of the first printing apparatus and the at least one second printing apparatus into a stability preference mode where stability is preferred.

7. The printing system according to claim 6,
   wherein the stability preference mode is a mode in which a transporting speed of a sheet is slowed down.

8. The printing system according to claim 1,
   wherein the at least one second printing apparatus for which the substitute printing reservation has been made enters a low power consumption state if the substitute printing reservation is canceled by the control apparatus.

9. The printing system according to claim 1,
   wherein the substitute printing reservation includes setting information for controlling acceptance of a print job, and
   wherein the at least one second printing apparatus, while in the waiting state for waiting to execute the print job instead of the first printing apparatus, performs acceptance of a print job from in accordance with the setting information included in the substitute printing reservation.

10. The printing system according to claim 1,
    wherein the substitute printing reservation includes one of (i) setting information for inhibiting acceptance of a print job from the at least one control apparatus, (ii) setting information for permitting acceptance of only a print job in which a consumable supply specified in the substitute printing reservation is not used, and (iii) setting information for permitting acceptance of a print job from a control apparatus.

11. A printing apparatus, connected via a network to at least one control apparatus, executing a print job in accordance with an instruction from the at least one control apparatus for execution of the print job, the printing apparatus comprising:
    an accepting unit configured to accept a substitute printing reservation made by the at least one control apparatus, the substitute printing reservation allowing the printing apparatus to execute a print job;
    an apparatus state setting unit configured to, when the substitute printing reservation has been accepted, set the printing apparatus to a waiting state for waiting to execute the print job; and
    a requesting unit configured to request cancellation of the substitute printing reservation when the printing apparatus enters a state in which a printing operation is disabled before the at least one control apparatus cancels the substitute printing reservation.

12. The printing apparatus according to claim 11, wherein the apparatus state setting unit sets the printing apparatus to a low power consumption state if the substitute printing reservation is canceled by the at least one control apparatus.

13. The printing apparatus according to claim 11, wherein the accepting unit accepts a print job in accordance with setting information included in the substitute printing reservation while in the waiting state.

* * * * *